United States Patent

Takeda et al.

[11] Patent Number: 5,295,637
[45] Date of Patent: Mar. 22, 1994

[54] CASSETTE LID-LOCKING ELEMENT WITH SHUTTER PORTION FOR CLOSING A LIGHT PASSAGE WINDOW

[75] Inventors: Hidekazu Takeda, Fujisawa; Nobuyuki Kaku, Naka; Yoshimi Maehara, Ootsu; Mikihisa Inoue, Otokuni, all of Japan

[73] Assignees: Hitachi Maxwell, Ltd., Osaka; Hitachi, Ltd., Tokyo, both of Japan

[21] Appl. No.: 948,654

[22] Filed: Sep. 23, 1992

[30] Foreign Application Priority Data

Sep. 24, 1991 [JP] Japan .................. 3-243119

[51] Int. Cl.⁵ .......................................... G11B 23/04
[52] U.S. Cl. ...................... 242/199; 360/132
[58] Field of Search ............ 242/199, 198, 197, 188, 242/186; 360/132, 74.5, 74.6, 92, 93, 96.1

[56] References Cited

U.S. PATENT DOCUMENTS

| | | | |
|---|---|---|---|
| 4,173,319 | 11/1979 | Umeda | 242/199 |
| 4,631,618 | 12/1986 | Ozawa et al. | 360/132 |
| 4,886,220 | 12/1989 | Oishi | 242/188 |
| 4,984,122 | 1/1991 | Sato | 360/132 |

FOREIGN PATENT DOCUMENTS 63-220490 9/1988 Japan .

Primary Examiner—Daniel P. Stodola
Assistant Examiner—John Rollins
Attorney, Agent, or Firm—Birch, Stewart, Kolasch & Birch

[57] ABSTRACT

A lid locking mechanism for a magnetic tape cassette intended to improve dust prevention and drip wherein a shutter for opening and closing of tape end detecting windows is integrally provided with a front lid stopper member for the tape cassette.

3 Claims, 5 Drawing Sheets

CASSETTE LID-LOCKING ELEMENT WITH SHUTTER PORTION FOR CLOSING A LIGHT PASSAGE WINDOW

BACKGROUND OF THE INVENTION

1. Field of the Invention

The present invention generally relates to a magnetic tape cassette and more particularly, to a front lid locking mechanism of a magnetic tape cassette particularly suitable for perfect dust proof and drip proof purposes.

2. Discussion of Related Art

Generally, in a magnetic recording and reproducing apparatus of a cassette type, the starting end and final end of the magnetic tape are detected by a so-called optical detecting method in which light emitted from a light emitting element inserted into the magnetic tape cassette is detected by light receiving elements disposed at side faces of the tape cassette in a state where the magnetic tape is held between the light emitting element and the light receiving elements. In other words, when transparent leader tapes provided at the winding start portion and the winding end portion of the cassette tape have arrived at the portion between the light emitting element and the light receiving elements, light emitted from the light emitting element transmits through the transparent leader tape, so as to be detected by the light receiving element for determining the starting end or final end of the magnetic tape.

In the above arrangement, on the side wall of the magnetic tape cassette, a tape end detecting window is formed at a predetermined position so as to allow light projected from the light emitting element to pass therethrough.

As one example, in the case of an 8 mm video tape cassette, a square hole of 2.5 mm square is formed at a height of 6.05 mm from a reference face of the tape cassette as specified in the standard. Normally, in the case where a front lid of the tape cassette is closed, the square hole is closed by a side wall of the front lid of the tape cassette, and only when the tape cassette is loaded on a related apparatus and the front lid is opened, will the square hole be exposed to provide a light path for the projecting light.

Incidentally, in the conventional tape cassette as described above, since a locking mechanism of the front lid is disposed in a space between a side wall of the front lid and a side wall of a tape cassette half or tape cassette housing, there is normally formed a gap equivalent to a thickness of a front lid stopper member between the side wall of the tape cassette half and the front lid side wall, in a state when the cassette front lid has been closed. Therefore, in the tape cassette construction as described above, the tape end detecting window is held in a state where it is exposed through the gap, this being disadvantageous not only with respect to dust prevention and drip prevention, but also resulting in deterioration in performance, such as the so-called drop-out effect or the like.

Meanwhile, when the tape end detecting window is provided in a position where it does not overlap the front lid side wall in terms of its plane, it is necessary to separately provide a shutter mechanism for the tape end detecting window, thus complicating the construction of the tape cassette, with consequent lowering in the assembling efficiency and reliability.

SUMMARY OF THE INVENTION

Accordingly, an essential object of the present invention is to provide a lid locking mechanism for a magnetic tape cassette which is provided with a shutter function for tape end detecting windows and being most suitable for dust proof and drip proof purposes.

Another object of the present invention is to provide a lid locking mechanism of the above described type which is simple in construction and stable in functioning at high reliability, which can be readily incorporated into magnetic tape cassettes at low cost.

In accomplishing these and other objects, in the present invention, a detecting window open/close portion capable of retaining the tape end detecting window in an open state after releasing stopping by the front lid stopper member is integrally provided with the front lid stopper member.

More specifically, according to one preferred embodiment of the present invention, there is provided a lid locking mechanism for a magnetic tape cassette, which includes a front lid provided at a front face of a magnetic tape cassette so as to be pivotally supported by side walls of the magnetic tape cassette for selective opening and closing of an opening portion of the magnetic tape cassette to draw out a magnetic tape incorporated therein, a front lid stopper member for retaining the front lid in a state where the opening portion is closed thereby, and a releasing operating member for releasing the front lid stopper member from the closed state of the front lid.

The magnetic tape cassette has detecting windows for tape end detection in the side walls thereof, and the front lid stopper member includes a stopper portion pivotally supported by the side wall of the magnetic tape cassette for maintaining the front lid in the state to close the opening portion, a releasing operating portion provided to protrude from the pivotal face, and a detecting window open/close portion for retaining the tape end detecting windows in the open state after the stopper releasing operation of the front lid stopper member.

By providing the shutter portion for the tape end detecting window integrally with the cassette front lid stopper member, the tape end detecting window is covered by the shutter portion to be shut off from the atmosphere, unless releasing of the cassette front lid stopper member is effected.

In the case where the tape end detecting window overlaps the side wall of the front lid of the magnetic tape cassette in terms of the plane, as in the 8 mm video tape cassette, it becomes possible to provide still a more perfect dust proof and drip proof capacity by the shutter function provided by the front lid stopper member of the magnetic tape cassette. In the above case, the tape end detecting window is opened only in the state where the front lid has been opened, with the magnetic tape cassette loaded on the apparatus, thereby making it possible to effect the tape end detection.

Meanwhile, in the case where the tape end detecting window does not overlap the tape cassette front lid in terms of the plane, the shutter portion is opened by the stopper releasing function of the front lid stopper member upon loading of the tape cassette on the apparatus, and thus it becomes possible to effect the tape end detection.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
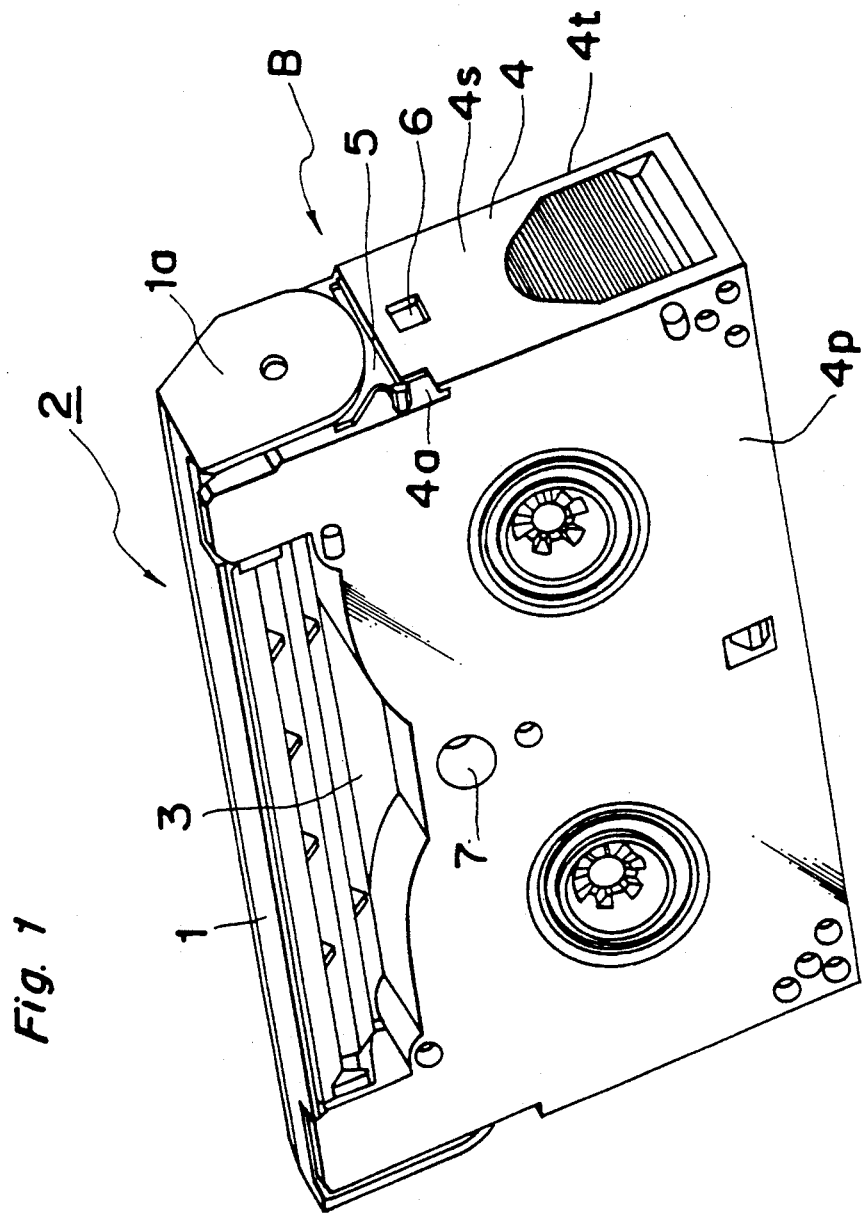
FIG. 1 is a perspective view of a magnetic tape cassette to which a lid locking mechanism according to one preferred embodiment of the present invention has been applied.

Before the description of the present invention proceeds, it is to be noted that like parts are designated by like reference numerals throughout the accompanying drawings.

Referring now to the drawings, there is shown in FIG. 1, a magnetic tape cassette 2 to which a lid locking mechanism according to one preferred embodiment of the present invention has been applied.

In FIG. 1, the magnetic tape cassette 2 generally includes a tape cassette half or tape cassette housing 4 (referred to as tape cassette half hereinafter) in a rectangular box-like configuration which has a top wall 4t, side walls 4s and a bottom plate 4p, and in which reels R1 and R2 wound with a magnetic tape 11 (FIGS. 2(a), 2(b)) are incorporated. At a front portion of the tape cassette housing 4 (i.e. at an upper portion in FIG. 1), an opening portion 3 is defined and the magnetic tape (not shown in FIG. 1) is stretched across the front portion of the opening portion 3, with a front lid 1 being pivotally connected, at its folded side portions 1a, to the corresponding side walls of the tape cassette half 4, so as to protect the magnetic tape against atmosphere and fumbling, etc.

At a recess portion 4a on one side wall 4s of the tape cassette half 4, there is provided a front lid stopper member 5 which is held between the side wall 1a of the front lid 1 and the side wall of the recessed portion 4a so as to retain the front lid 1 in a closed state, as shown in FIG. 1. In the side wall 4s of the tape cassette half 4, a tape end detecting window 6 for detecting the starting end and trailing end of the magnetic tape 11 is formed, while in the corresponding side wall of the recessed portion 4a of the tape cassette housing 4, another similar tape end detecting window 6a is, formed (not shown in FIG. 1; described later in FIG. 3(b)). At an upper central portion of the bottom plate 4p of the tape cassette half 4 in FIG. 1, a detecting hole 7 is formed to receive a light emitting element for the tape end detection (not shown).

Figure 2A:
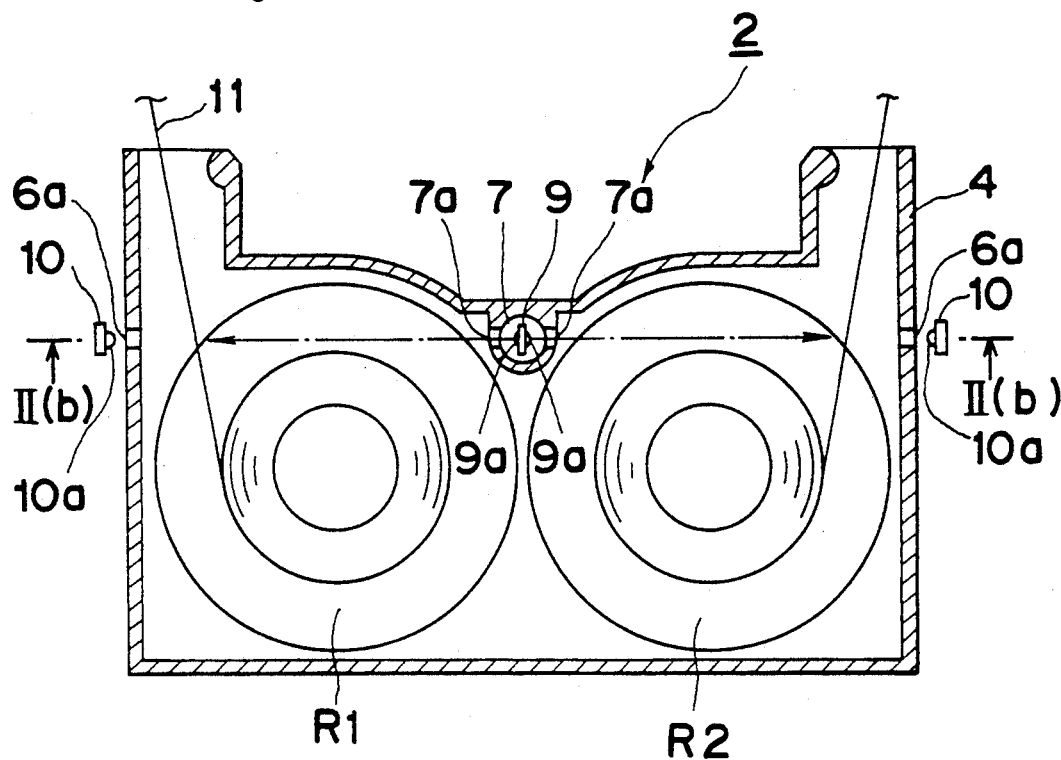
FIG. 2(a) is a top plan sectional view of the magnetic tape cassette for explaining a principle of tape end detection.
Figure 2B:
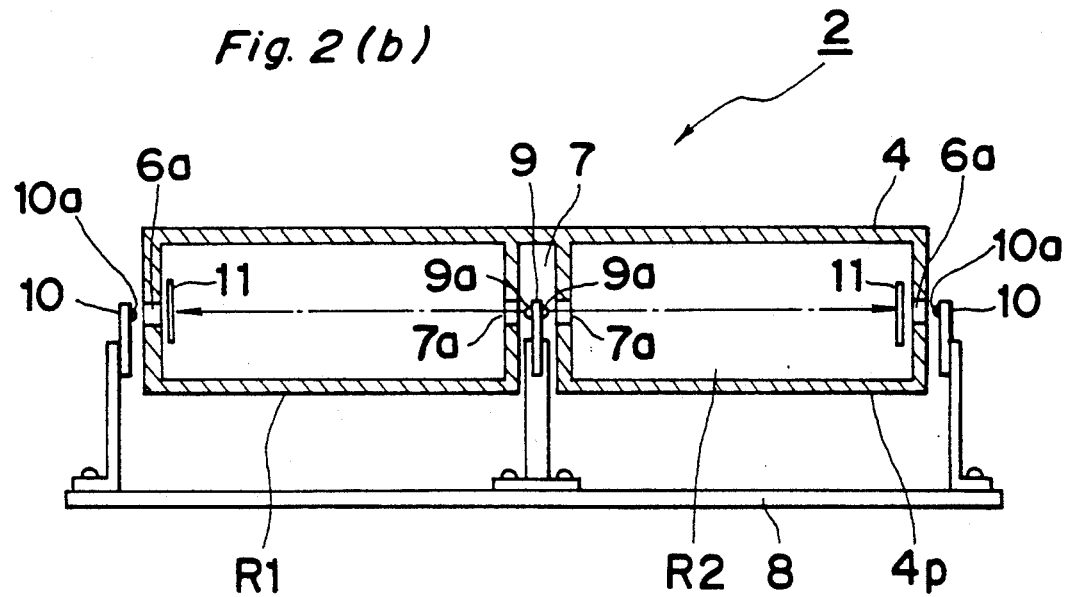
FIG. 2(b) is a side sectional view taken along the line II(b)—II(b) in FIG. 2(a)

Referring further to FIGS. 2(a) and 2(b) showing schematic diagrams of the tape cassette, the general principle of the tape end detection as employed in the tape cassette according to the present invention will be explained hereinafter.

In the first place, the construction of the tape cassette will be described with reference to FIGS. 2(a) and 2(b).

As shown in FIG. 2(b), upon loading of the tape cassette 2 on a related apparatus, the tape cassette 2 is positioned at a predetermined height on the base plate 8 of the apparatus. The light emitting element 9 fixed on the base plate 8 of the apparatus is inserted into the detecting hole 7 of the tape cassette 2 when the tape cassette 2 has been loaded on the apparatus. Meanwhile, a pair of spaced light receiving elements 10 are also arranged on the base plate 8 at positions facing the side walls of the tape cassette 2 so that a light receiving portion 10a of each of the light receiving elements 10 is located at the position of the tape end detecting window 6a of the tape cassette 2.

Subsequently, the principle of the detection will be described hereinbelow.

In FIGS. 2(a) and 2(b), light is emitted from light emitting portions 9a of the light emitting element 9, and reaches the tape end detecting windows 6a through slits 7a preliminarily formed in the detecting hole 7 and along light paths indicated by the arrows. In the above case, the magnetic tape 11, stretched within the tape cassette 2, is located in the vicinity of the tape end detecting windows to cut off the light path. When the magnetic tape 11 is brought into the state at the start of winding or at the end of winding, a transparent leader tape provided at each tape end portion comes between the light emitting element 9 and the light receiving element 10, and light free from the obstruction, by the magnetic tape 11, is received by the corresponding light receiving element 10, and thus the starting end or terminating end of the magnetic tape is detected.

In the above construction, the tape end detecting windows 6a and the slits 7a are required for allowing light to pass therethrough. Since the slits 7a formed in the tape cassette 2 are relatively spaced from the magnetic tape 11 within the tape cassette, they have a small influence over the magnetic tape 11, whereas the tape end detecting windows 6a formed in the side walls of the tape cassette 2 are comparatively close to the magnetic tape 11 within the tape cassette 2, and therefore, the magnetic tape 11 is considered to be largely affected by dust and water drops entering from the outside. Therefore, when the tape cassette 2 is not loaded on the apparatus, it is necessary to perfectly close the tape end detecting windows 6a.

Figure 3A:
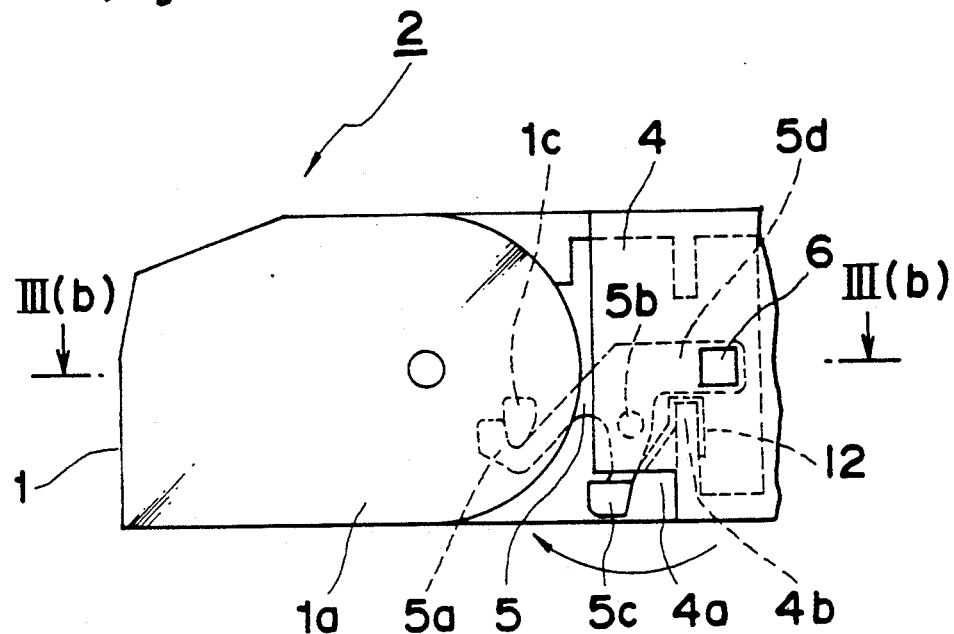
FIG. 3(a) is a side elevational view showing on an enlarged scale, a front lid locking mechanism (locked state) employed in the magnetic tape cassette of FIG. 1.
Figure 3B:
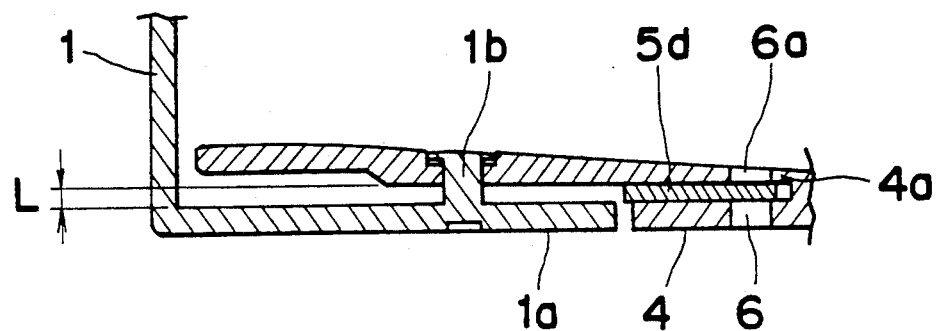
FIG. 3(b) is a cross section taken along the line III(b)—III(b) in FIG. 3(a)

Referring further to FIGS. 3(a) and 3(b), the construction of the front lid locking mechanism directly related to the present invention will be described hereinbelow.

The front lid 1 is pivotally supported about a shaft 1b integrally formed with the side wall 1a thereof so as to be generally perpendicular to the side wall 1a, and is urged counterclockwise or in a closing direction by an urging means (not shown). Moreover, the front lid 1 has a projection 1c extending inwardly from the side wall 1a thereof, and by the engagement of the projection 1c with a stopper claw 5a integrally formed with the front lid stopper member 5 in a state as shown in dotted lines in FIG. 3(a), the front lid 1 is held in the closed state.

Here, the front lid stopper member 5 is held in the recessed portion 4a of the tape cassette half 4 in a state where it is pivotal about a shaft 5b integrally formed with the stopper member 5, and is urged in a direction indicated by an arrow, by an urging means 12 similarly held in the recessed portion 4a. A stopper portion 4b is integrally formed with the tape cassette half 4 in order to restrict rotation of the front lid stopper member 5. Meanwhile, the front lid stopper member 5 has, at its one end, a releasing operating portion 5c integrally formed therewith at the outer side from the pivotal surface, and at its other end, a shutter portion 5d provided to cover the tape end detecting windows 6 and 6a. As shown in the cross section of FIG. 3(b), since the shutter portion 5d is provided in a state to fill a gap L for the recessed portion of the tape cassette half 4, entry of dust, water drops, etc. from the outside may be advantageously prevented.

Figure 4:
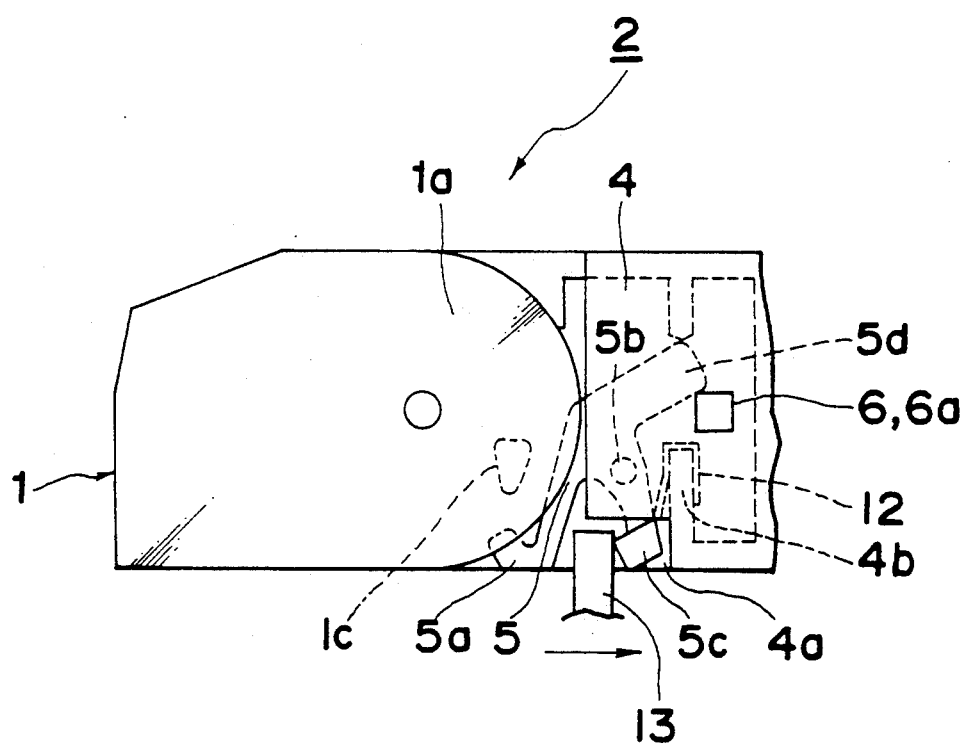
FIG. 4 is a view similar to FIG. 3(a), which particularly shows an unlocked state thereof.

Referring also to FIG. 4, a releasing function of the front lid locking mechanism will be described hereinafter. It is to be noted here that in FIG. 4, like parts in FIGS. 3(a) and 3(b) are designated by like reference numerals for brevity of explanation.

In FIG. 4, there is shown a releasing operating member 13 which is generally integrally formed with a cassette holder (not shown). Upon loading of the tape cassette 2 on the cassette holder, the releasing operating member 13 contacts the releasing operating portion 5c of the front lid stopper member 5, and through movement in a direction of the arrow, the front lid stopper member 5 is pivoted as shown, whereby the tape end detecting windows 6 and 6a shut off by the shutter portion 5d are opened to enable the tape end detection. At this time, the projection 1c for retaining the front lid 1 is disengaged from the stopper claw 5a of the front lid stopper member 5, and the front lid 1 is brought into the state where it can be opened.

Figure 5A:
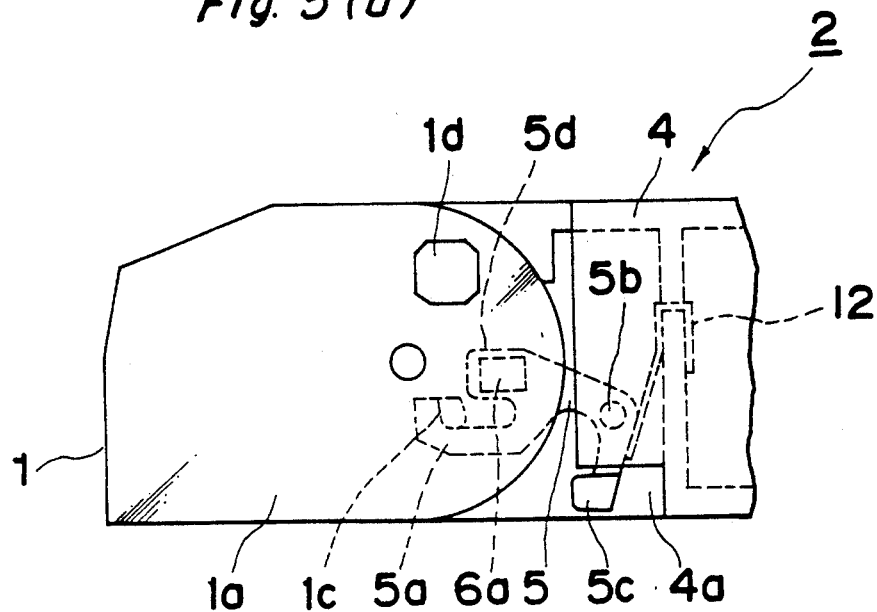
FIG. 5(a) is a view similar to FIG. 3(a), which particularly shows another embodiment thereof (locked state)
Figure 5B:
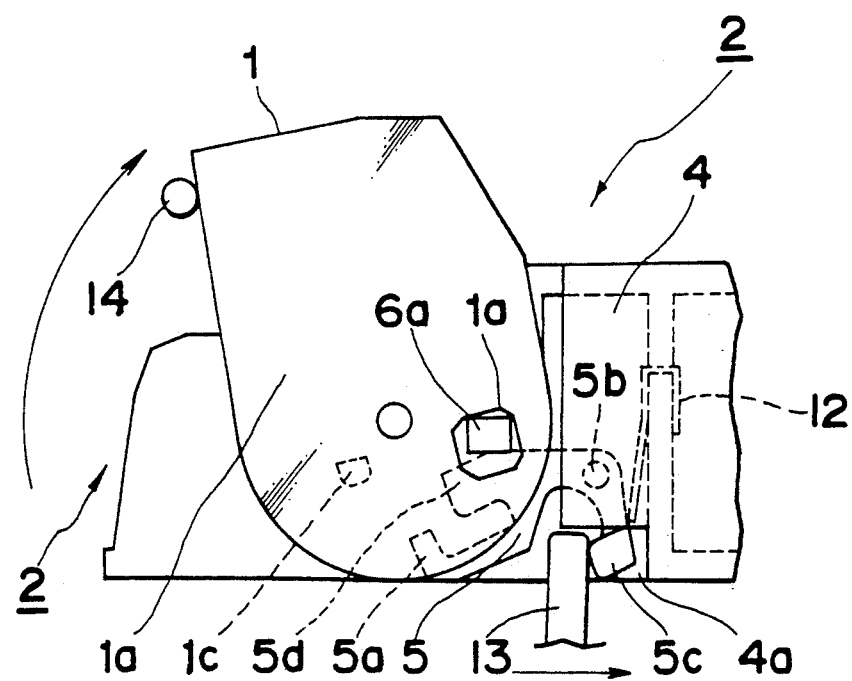
FIG. 5(b) is a view similar to FIG. 5(a), which particularly shows an unlocked state thereof.

Referring further to FIGS. 5(a) and 5(b), there is shown a front lid locking mechanism according to another embodiment of the present invention as applied to an 8 mm video tape cassette.

FIG. 5(a) shows the lid locking mechanism of the tape cassette 2 in the state where the lid 1 is locked, while FIG. 5(b) shows the same in the state where the lid 1 is not locked.

As shown in FIG. 5(a), the tape end detecting window 6a is provided in the side wall of the tape cassette half 4 overlapping, in terms of its plane, the side wall 1a of the front lid 1, and is in a state where it is covered through double shutters by the shutter portion 5d of the front lid stopper portion 5 and the side wall 1a of the front lid 1. Moreover, a square hole 1d is formed in the side wall 1a, and is arranged to be displaced to the position of the tape end detecting window 6a during opening of the front lid 1 so as to maintain the detecting window 6a in the opened state. Since other constructions are generally similar to those in FIG. 3(a), detailed description thereof is eliminated for brevity.

Referring particularly to FIG. 5(b), releasing of the front lid locking mechanism and opening function of the tape end detecting window will be described hereinbelow.

In FIG. 5(b), when the tape cassette 2 is loaded on the cassette holder (not shown) in the first place, the front lid stopper member 5 is rotated as shown in the drawing by the displacement of the releasing operating member 13 provided on the cassette holder in the direction of an arrow, and the covering of the tape end detecting window 6a by the shutter portion 5d is removed, while the projection 1c for retaining that front lid 1 is disengaged from the stopper claw portion 5a, and the front lid 1 is brought into the state ready to open. Then, when the cassette holder is lowered and loaded on the apparatus, the front lid 1 is rotated in the direction of the arrow by the front lid opening member 14 provided on the apparatus, and thus, the tape end detecting window 6a is brought into the opened state so as to enable the tape end detection.

As described so far, according to the above embodiment of the present invention, since the shutter portion of the tape end detecting windows 6 and 6a is integrally provided with part of the front lid stopper member 5, perfect dust and drip prevention for the tape end detecting windows 6 and 6a may be effected by the simplest construction, and deterioration in performance related to magnetic tapes such as drop-out, etc. can be advantageously eliminated, whereby reliability of the tape cassette is remarkably improved, thus making it possible to fully realize the capacity of a high performance magnetic tape.

It is to be noted here that, in the foregoing embodiments, the front lid locking mechanism for the magnetic tape cassette according to the present invention has been described with respect to the case where the front lid stopper member 5 is provided at one side face of the tape cassette 2. However, the concept of the present invention is not limited in its application to the above arrangement alone, but can of course be readily applied to the case where two front lid stopper members are provided at opposite side faces of the tape cassette 2. In the case of the 8 mm video tape cassette currently available, the front lid locking mechanism is provided only at one side face, while the tape end detecting window provided at the other face is covered in a state of generally close contact, by the side wall 1a of the front lid 1, and thus, there are no problems associated with dust prevention and drip prevention. Meanwhile, in the tape cassette in which the tape end detecting window is provided at a position not overlapping in terms of its plane, the side wall 1a of the front lid 1, there may be cases where a detecting window open/close member functioning in association with opening and closing of the front lid 1 is required for the dust and drip prevention of the tape end effecting window at the side wall not provided with the front lid stopper member.

As is clear from the foregoing description, through employment of the lid locking mechanism for the magnetic tape cassettes according to the present invention, complete dust prevention and drip prevention for the tape cassette which utilizes high performance magnetic tapes such as metal tapes, evaporation tapes, etc. may be achieved by the simplest means, whereby deterioration in performance such as drop-out and the like can be eliminated with the improvement of reliability of the tape cassettes.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A magnetic tape cassette, which comprises a tape cassette housing, a lid provided at a front face of said tape cassette housing pivotally supported by side walls of said tape cassette housing for selectively opening and closing an opening portion of said magnetic tape cassette to draw out a magnetic tape incorporated therein, and a lid-locking stopper member for retaining said lid in a closed state pivotally supported by at least one of said side walls of said magnetic tape cassette, whereby said opening portion is closed thereby;

said tape cassette housing having detecting windows for tape end detection in said side walls thereof, said lid-locking stopper member including a stopper portion for maintaining said lid in said closed state to close said opening portion, a releasing operating portion for releasing said lid from said closed state, and a detecting window open/close portion for protecting said tape end detecting windows from the environment when in said closed state and retaining said tape end detecting windows open upon release of said lid from said closed state.

2. A magnetic tape cassette as in claim 1, wherein said detecting window open/close portion comprises a shutter portion and said tape end detecting windows are adapted to be maintained open by a releasing operation of said stopper member and opening of said lid.

3. A magnetic tape cassette as in claim 1, wherein said lid comprises a side wall having an opening therein for maintaining said tape end detecting windows open when said lid is opened.

* * * * *